United States Patent [19]

McClaflin

[11] 4,392,622

[45] Jul. 12, 1983

[54] COMBINED BEAM SUPPORT FOR LANDING GEAR

[75] Inventor: John R. McClaflin, Kent, Wash.

[73] Assignee: The Boeing Company, Seattle, Wash.

[21] Appl. No.: 218,772

[22] Filed: Dec. 22, 1980

[51] Int. Cl.³ .............................................. B64C 25/10
[52] U.S. Cl. .............................................. 244/102 A
[58] Field of Search ......... 244/102 R, 102 A, 102 SS, 244/102 SL, 100 R, 108

[56] References Cited

U.S. PATENT DOCUMENTS

| | | | |
|---|---|---|---|
| 2,082,598 | 6/1937 | Saulnier | 244/102 R |
| 2,123,113 | 7/1938 | Levy | 244/102 R |
| 2,182,333 | 12/1939 | Cowey | 244/102 R |
| 2,318,568 | 5/1943 | Wintermute et al. | 244/102 R |
| 2,415,615 | 2/1947 | Wallace | 244/102 |
| 2,440,068 | 4/1948 | Beringer | 244/100 |
| 2,474,694 | 6/1949 | Saulnier | 244/102 R |
| 2,476,610 | 7/1949 | Linscott | 244/102 R |
| 2,559,451 | 7/1951 | McBrearty | 244/103 |
| 2,562,778 | 7/1951 | Egly | 244/102 R |
| 2,630,990 | 3/1953 | Kanode et al. | 244/102 R |
| 2,659,555 | 11/1953 | Schlender | 244/102 R |
| 2,750,134 | 6/1956 | Hawkins, Jr. et al. | 244/102 R |
| 4,065,077 | 12/1977 | Brooks | 244/54 |
| 4,087,062 | 5/1978 | Masclet | 244/102 R |
| 4,155,522 | 5/1979 | Sealey | 244/102 R |

FOREIGN PATENT DOCUMENTS 732203 2/1943 Fed. Rep. of Germany ... 244/102 R
1467923 12/1965 France .............................. 244/102 R Primary Examiner—Trygve M. Blix
Assistant Examiner—Jesus D. Sotelo
Attorney, Agent, or Firm—Delbert J. Barnard; Eugene O. Heberer; Joan H. Pauly

[57] ABSTRACT

The front bearing for a landing gear trunnion is carried by a rear wing spar and the rear bearing is carried by a simple beam which is pivotally attached at its inner end to the body frame. A main attach pin pivotally connects the outer end of such beam to a pair of connector plates, one located on each side of the connection. A pair of shear pins connect the connector plates to a short cantilever beam which is connected to and project inwardly from the rear wing spar, generally in line with the landing gear beam. One of the shear pins is positioned generally horizontally outwardly from the main attach pin. The second shear pin is positioned generally vertically below the main attach pin. Generally vertical overloads are carried by the lower shear pin load and such shear pin is designed to fracture in response to a load slightly below the vertical load reacting capability of the reaction structure. Generally horizontal overloads are carried by the upper pin or by both pins together which are sized to break under loads slightly below the horizontal load reacting capability of the reaction structure. Control system elements for use in flying the aircraft extend along the wing spar forwardly of the fused connection so that they are not damaged by the landing gear breaking away.

14 Claims, 23 Drawing Figures

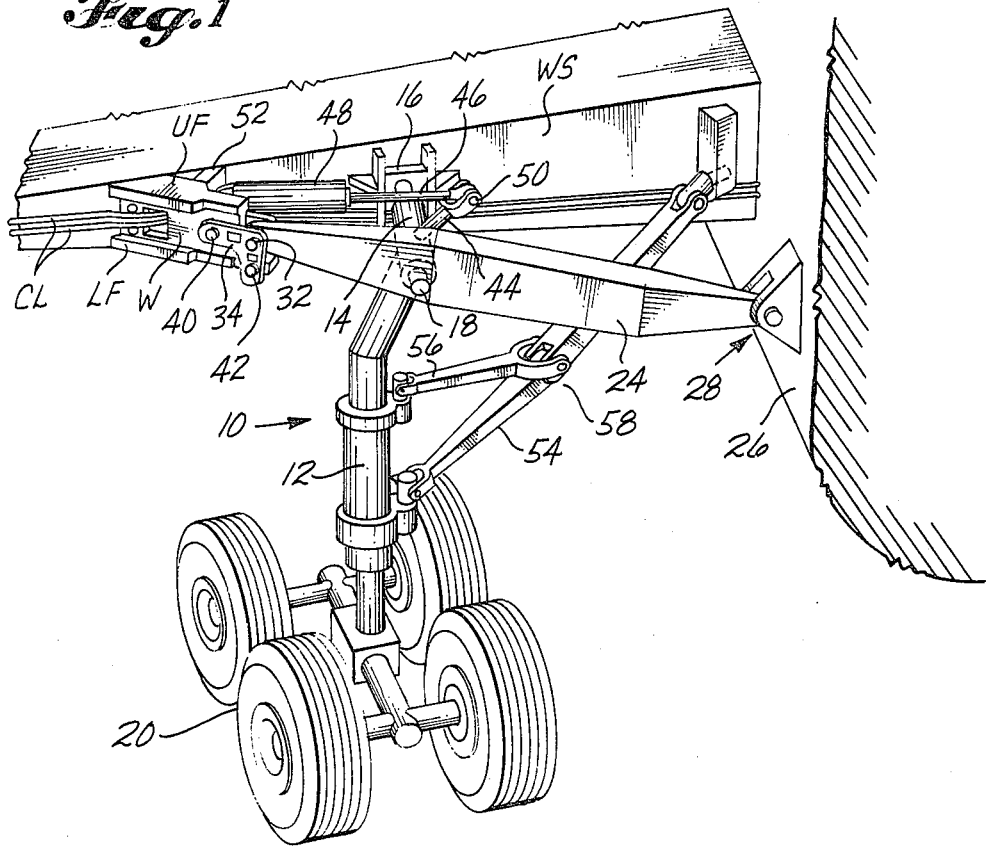
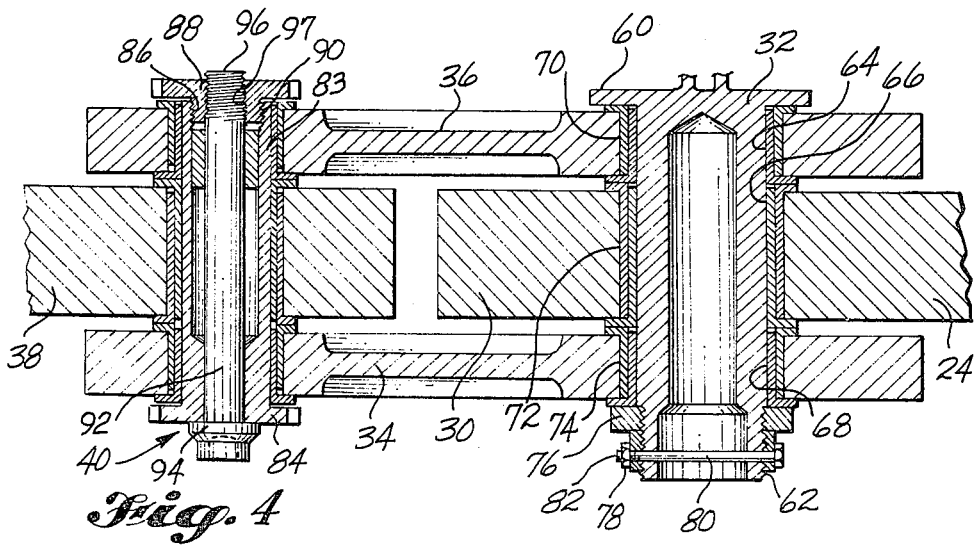

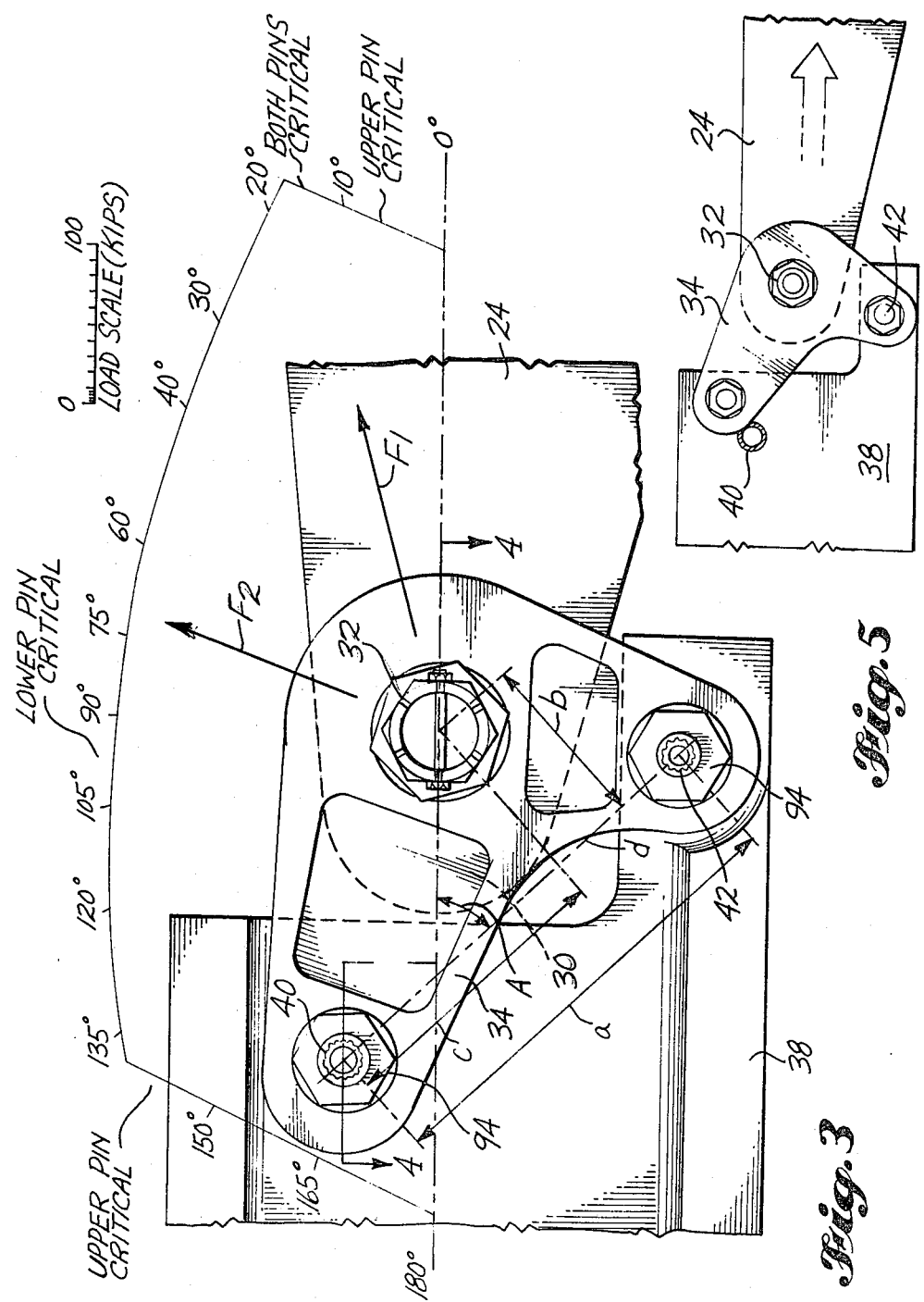

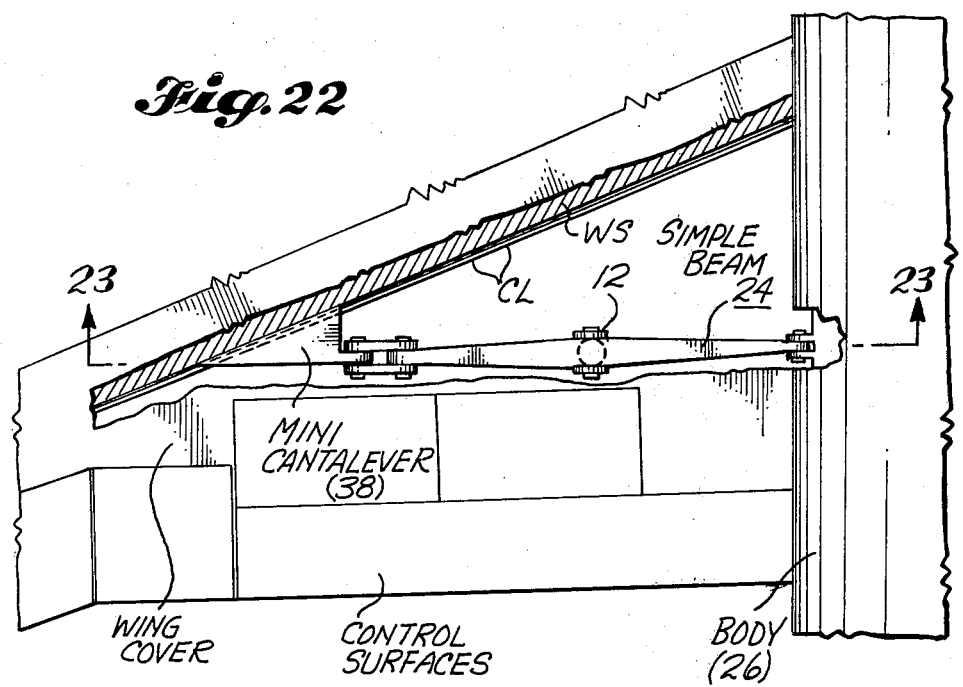
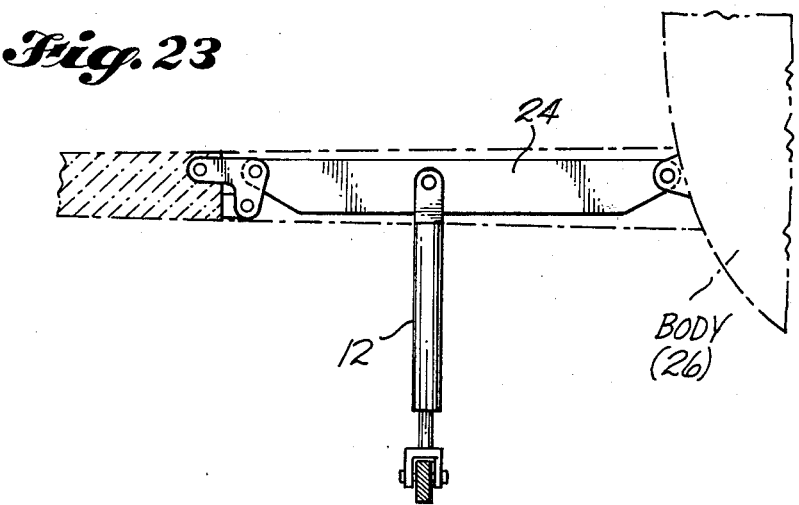

COMBINED BEAM SUPPORT FOR LANDING GEAR

BACKGROUND OF THE INVENTION

1. Field of the Invention

The present invention relates to an improved support system for an aircraft landing gear trunnion, and in particular to a support system which permits movement of the landing gear farther out from the aircraft body without a loss in landing gear stiffness, and which provides for protection of control lines extending through the wing against damage in the event a landing gear is severed from the aircraft.

2. Description of the Prior Art

In low wing, swept wing airplanes the main landing gears are usually carried on trunnions having fore and aft axes. The forward ends of the trunnions are carried on the rear wing spar and the aft ends are carried on a variety of types of structure.

Aircraft overall efficiency, as influenced by weight and balance factors, is improved for certain aircraft configurations by locating the main landing gear so far aft of the rear wing spar that it complicates the structural problem of landing gear attachment. Also, the combination of (1) a landing gear length great enough to provide adequate clearence for under wing engines and for the tail at liftoff and (2) the necessity of stowing the wheels in the underbody dictates a wide thread which further complicates gear attachment. A third complicating factor is that the fore and aft trunnion bearings must be far enough apart and held in stiff enough structure to contribute adequately to fore and aft gear stiffness. A limber gear interferes with efficient anti-skid operation.

There are two well known landing gear attachment structure arrangements. The first involves use of a cantilever structure extending rearwardly from the rear wing spar to mount the aft end of the trunnion. The second involves the use of a landing gear beam disposed rearwardly of the rear wing spar, extending from a connection with the body frame outwardly to a connection with the rear wing spar. An attempted use of either arrangement for supporting a landing gear trunnion at a location that is spaced both farther out on the wing and farther aft of the rear wing strut than the conventional trunnion location would present a problem. A landing gear beam would become too flexible and/or too heavy because, to accomodate the landing gear position, it must be made both longer and shallower in order to fit within the wing envelope. A cantilever support becomes thinner because the air foil section is thinner at the more aft low location. Making the cantilever structure stiff enough, if possible, would require excessive weight.

A principal object of the present invention is to provide a new structural concept for supporting the aft end of a landing gear trunnion, permitting the use of a lightweight, structurally stiff mounting for a wide thread, and as further aft and further out positioning of the main landing gear, and further providing for the protection of control lines extending through the wing in the event of a loss of a landing gear.

SUMMARY OF THE INVENTION

In its basic makeup, the improved landing gear mount of the present invention comprises the combined use, in a unique manner, of a short or "mini" cantilever beam and a longer simple beam which is interconnected between the free end of the cantilever beam and a frame portion of the aircraft body. The cantilever beam projects from a rear portion of the wing spar generally inwardy towards the aircraft body. The simple beam is positioned rearwardly of the wing spar and extends between the cantilever beam and the body frame. A forward bearing for the landing gear trunnion is carried by the wing spar and an aft bearing for such trunnion is carried by an intermediate portion of the simple beam.

The combination of the short cantilever beam and the simple beam as a rear support for the trunnion makes it possible for the total beam structure to be stiff and strong. It also allows movement of the landing gear farther outwardly from the aircraft body without a loss in landing gear stiffness. If further permits a location of control lines which extend from the aircraft body outwardly along the rear side of the wing spar to be protected from damage in the event the landing gear is lost during a landing or takeoff.

According to an aspect of the invention, the short cantilever beam is constructed to include a longitudinal web and perpendicular flanges, providing a rigid structure which is light weight. The cantilever beam may also include a short brace which is interconnected between the wing spar and an intermediate portion of the cantilever beam. Such brace may also be of a web and flange construction.

According to an aspect of the invention, the actuator for moving the landing gear between its stowed and in use positions is connected at one end to an intermediate portion of the cantilever beam, e.g. to the brace member.

According to another aspect of the invention, the outer end of the simple beam is connected to the cantilever beam by means of a fused connection and control system means (e.g. hydraulics, electrical control cables, etc.) extending through the wing are located forwardly of such connection, so that if such fused connection is broken away, by some sort of overload on the landing gear during takeoff or landing, the control systems will not be damaged and can still be utilized to help fly the aircraft—if the aircraft is otherwise still flyable. It is contemplated that any break away of the landing gear would merely break loose the simple beam from its connection to the cantilever beam, attended by a partial break away of some wing trailing edge structure located in the vicinity of the landing gear, but leaving the wing fuel tank undamaged so that the pilot could continue to fly the airplane if doing so would be beneficial to passenger and crew safety. For example, if a landing gear were to break during an attempted landing, the pilot might be able to fly the airplane back up into the air and circle the runway, to allow ground personnel to apply a fire retardant foam to the runway. With one or both landing gears missing, the pilot would have to make a crash landing and the ability to pick up the airplane and fly it until ground fire retardant foam was on the runway would increase the chances of a relatively safe landing.

The use of a short cantilever beam projecting from the wing spar makes it possible to provide a reaction point spaced behind the wing spar and towards the aircraft body a sufficient distance that a relatively short simple beam can be used between such reaction point (i.e. the cantilever beam) and the body frame. The length of such simple beam is much shorter than it would be if it occupied the same position but were connected directly between the wing spar and the body frame. As a result of its short length, the simple beam is a relatively stiff member. The advantages of this combination of a short, stiff and strong cantilever beam and a relatively short and stiff simple beam, makes it possible to mount a stiff landing gear structure at a location that is further out from the aircraft body than would be possible if only a simple beam, or only a cantilever beam, were to be used, with the same wing configuration.

These and other objects, advantages, and features of the present invention, will be apparent from the preferred embodiment described below.

BRIEF DESCRIPTION OF THE DRAWING FIGURES

Referring to the drawing wherein like reference characters designate like parts throughout the several views:

FIG. 1 is a pictorial view looking from above and toward the rear and one side of a landing gear assembly for an aircraft, with portions of the wing structure removed for the purpose of exposing the supporting beam structure for the landing gear which is housed within the wing, such view also showing an embodiment of the fused connection of the present invention;

FIG. 3 is an enlarged scale elevational view of a preferred fused connection between the mini cantilever beam and the simple beam;

FIG. 4 is a sectional view taken substantially along line 4—4 of FIG. 3;

FIG. 5 is a view similar to FIG. 3, showing a failure of the upper shear pin of the fused connection in response to a generally horizontal load which exceeds the shear strength of such shear pin, and showing the connector plate rotated in position about the lower shear pin;

FIG. 22 is a fragmentary top plan view of the landing mount region of an aircraft wing employing an embodiment of the present invention; and FIG. 23 is a fragmentary sectional view taken substantially along line 23—23 of FIG. 22, with many parts omitted.

DESCRIPTION OF THE PREFERRED EMBODIMENT

Figure 2:
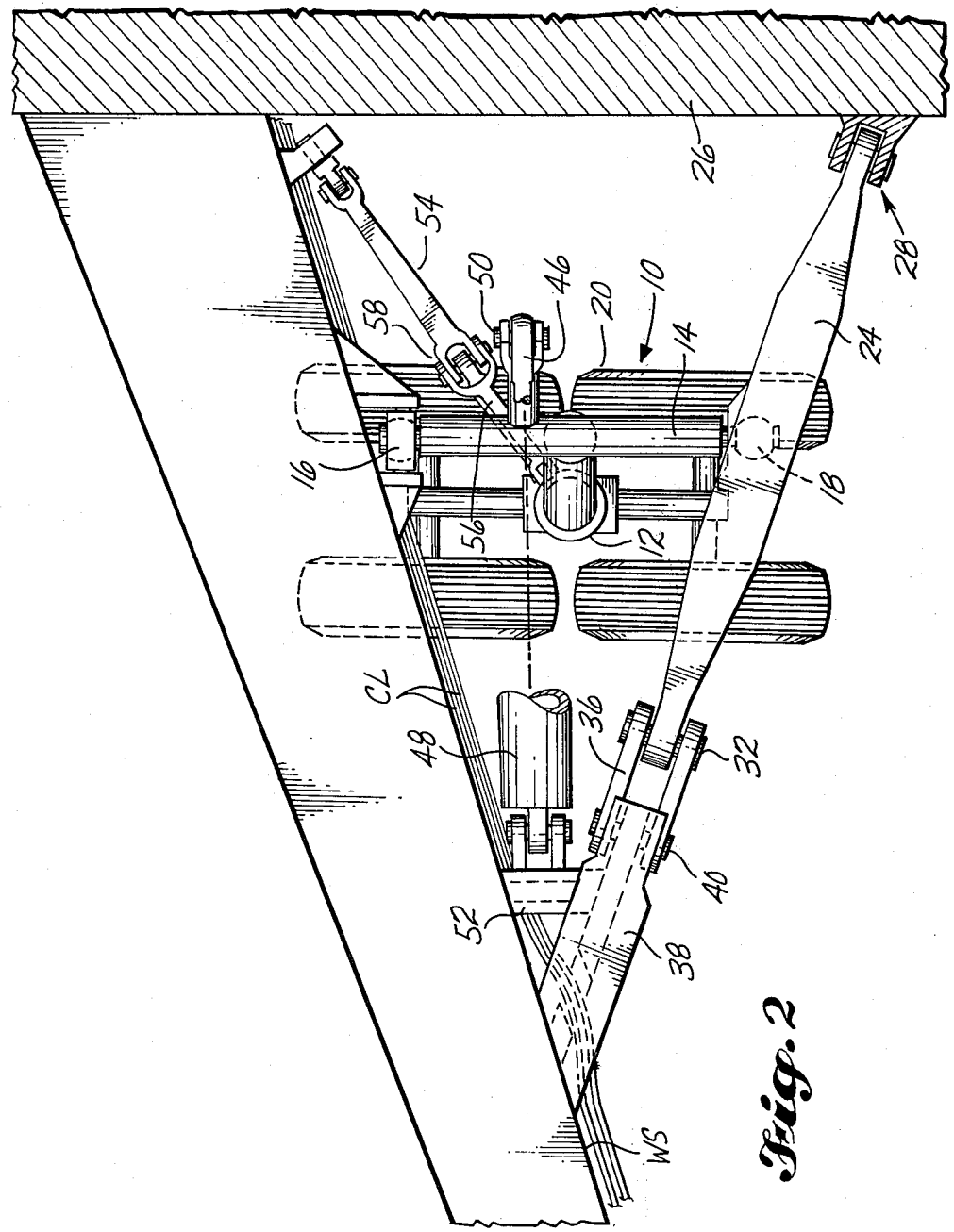
FIG. 2 is a top plan view of the structure shown by FIG. 1, with a central portion of a hydraulic actuator used to move the landing gear between its extended and retracted positions being broken away for the purpose of exposing other parts which are located below it.

In conventional fashion, the landing gear 10 per se comprises a strut 12 which depends from a trunnion member 14 having front and rear pivots 16, 18. The lower or free end of the strut 12 is connected to a wheel assembly 20.

The mounting beam structure for the trunnion member 14 comprises a forward bearing 16 carried by the rear main wing spar WS. A rear trunnion bearing 18 is carried by a landing gear beam 24. Beam 24 is connected at its inner end to the aircraft body 26, by means of a knuckle pin joint 28, and is similarly connected at its outer end to the fused connection of the present invention.

As best shown by FIGS. 3–7, the outer end portion 30 of beam 24 is attached by means of a main attach pin 32 to a pair of connector plates 34, 36. Plates 34, 36 are of modified triangular form, i.e. they have three sides and three corners. The three corners are rounded and material is removed from the faces and on one side for the purpose of weight reduction. Connector plates 34, 36 are attached to a short beam 38 which projects in cantilever fashion from main spar WS. Plates 34, 36 are connected to beam 38 at two vertically and horizontally spaced locations, by means of shear pins 40, 42.

A lever arm 44 projects upwardly from trunnion member 14 generally opposite from strut 12.

A yoke may be provided at the free end of lever arm 44 to receive between its two parts, in knuckle joint fashion, the free end portion of a piston rod 46 of an actuator 48, provided to move the landing gear assembly 10 between extended and retracted positions. A cross-pin 50 extends through the side parts of the yoke and through the end portion of the piston rod to pivotly connect such parts together. The opposite end of the actuator 48 is pivotly attached in similar fashion (see FIG. 2) to a short cross beam 52 which extends between rear main spar WS and the short cantilever beam 38.

In preferred form, the landing gear includes a two part foldable strut 54 which extends diagonally from a lower portion of main strut 12 up to a point of connection with the main spar WS that is closely adjacent the aircraft body 26. A fold control arm 56 extends from an intermediate portion of the main strut 12 to a pivot joint 58 near the center of the foldable strut 54. Arm 56 serves to fold and unfold strut 54 during movement of the wheel assembly 10 between its extended and folded positions.

The fold control arm 56 and two parts of strut 54 include pivot pin joints at each of their ends. These joints are of conventional construction and per se form no part of the present invention and for this reason they will not be described in any further detail.

As should be evident, a retraction of the actuator 48 will exert a pull on lever 44 and swing the wheel assembly 10 up into its folded or stowed position within the wing structure. An extension of actuator 48 will push against the lever 44 and cause the wheel assembly 10 to swing downwardly from its stowed position into its use or operative position. As strut 12 swings downwardly the brace arm 54 unfolds. When the wheel assembly 10 is in its operative position (FIG. 1) the two parts of the brace arm 54 are in alignment and the brace arm is capable of transmitting forces from the lower portion of the wheel strut 12 to the body end of rear main spar WS.

As best shown by FIG. 4, a typical embodiment of the main attach pin 32 includes a relatively flat head 60 at one of its ends and external threads 62 at its opposite end. The shank portion of pin 32 extends through a series of plain bearings or bushings 64, 66, 68 which are concentrically situated inside of a second set of bushings 70, 72, 74 which in turn fit snuggly within holes formed in the plates 34, 36 and in end portion 30 of beam 24. Radial flanges at the ends of the sleeves 64, 66, 68, 70, 72, 74 project radially outwardly a ways between adjacent side faces of elements 60, 36, 30, 34, 76 and function as bearings.

A jam nut 76 is threaded onto the threads 62. Then a lock nut 78 is applied. Finally, a cross-bolt 80 is installed through aligned openings in nut 78 and in the threaded end portion of pivot pin 32. Bolt 80 is secured in place by means of a nut 82.

Referring to FIG. 4, a typical shear pin 40 is shown to have a tubular body 83 having a relatively flat head 84 at one end and internal threads 86 at the opposite end. An internal nut 88 having an externally threaded shank portion 90 is threaded into the open end of shear pin 40. A bolt 92, having a flat head 94 at one end and a threaded portion 96 at its opposite end is inserted axially through the shear pin 40, from the head end thereof, and at its opposite end is threaded into the nut 88 at 97.

As shown, the shear pins 40, 42 are provided with concentric sleeve bearing sets like those used with the main attach pin 32.

Referring back to FIG. 1, a vertical drop of the aircraft during landing could apply a vertical overload on connection 32, 34, 36, 40, 42. The force of the wheels 20 hitting the runway would be transmitted by strut 12 to beam 18 and from beam 18 to main attach pin 32. A severe drag or horizontal impact force (such as wheels 20 striking an edge of the runway) would be reacted by beam 24 in a generally horizontal direction due in part to the presence of brace 54.

FIG. 3 shows a fused connection designed for use at the outer end connection of a landing gear support beam to a wing frame member. This connection forms the subject matter of the copending Victor A. Munsen and J. Randall McClaflin application Ser. No. 218,957, filed Dec. 22, 1980 and entitled Fused Connection Adapted To Fail Under Different Overloads Acting In Different Directions. Such application like this one has been assigned to The Boeing Company. In this example the upper shear pin or fuse bolt 40 has a 195 K capacity and a shear area of 1.346 square inches. The lower shear pin or fuse bolt 42 has a 162.4 K capacity and a shear area of 1.121 square inches. The two shear pins 40, 42 are spaced 14.23 inches apart on center (dimension A). The angle A, measured between a horizontal line and a line d passing through the centers of the two shear pins 40, 42 is 46.5 degrees. The center of the main attach pin 32 is perpendicularly offset from such line a distance b of 5.54 inches. A distance c along line d, measured from the center of shear pin 40, to the point of perpendicular intersect of such line d with a line b is 9.135 inches.

FIG. 3 includes a capacity polar for the fused connection. Such polar is labeled to show the zones in which, for the specific example presented, the shear pins 40, 42 are operative. Also, such diagram is drawn to scale so that the magnitude of overload forces passing through the center of main attach pin 32 can be calculated in any direction between zero degrees and 180 degrees.

FIG. 3 and FIGS. 5-8 illustrate the fused connection in operation.

FIG. 5 depicts what happens when an overload force is applied on the main attach pin 32 within the zone of zero degrees to about 17.5 degrees, labeled "upper pin critical" in FIG. 3. An overload acting in this zone causes the upper shear pin 40 to fracture first. Such fracturing frees the outer end of beam 24 and the connector means for a limited amount of upward pivotal movement. Fracturing of pin 40 alone may be all that is necessary in order to relieve a temporary applied overload. If the overload is still present when the parts reach their limits of movement, permitted by fracturing of pin 40, the second pin 42 will break.

Figure 6:
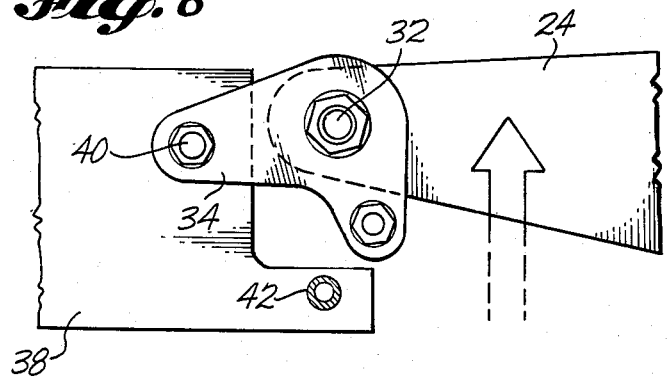
FIG. 6 is a view like FIG. 5, depicting failure of the lower shear pin in response to a generally vertical load and rotation of the connector plates about the upper shear pin.
Figure 7:
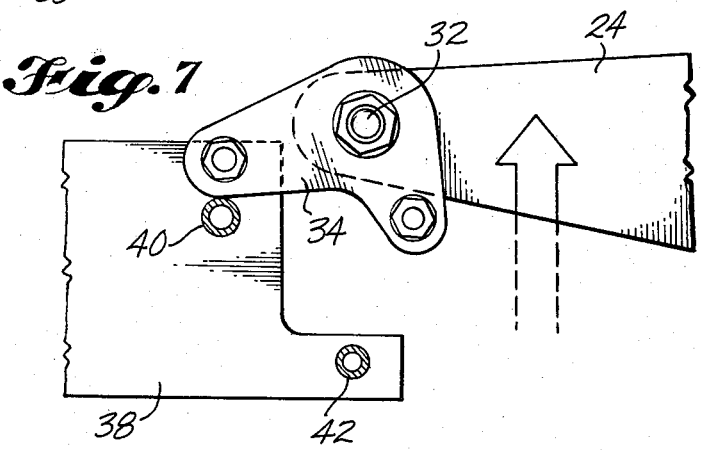
FIG. 7 is a view like FIGS. 5 and 6, depicting failure of the upper shear pin following rotational movement of the connector plates to the limit permitted by the connection.

FIGS. 6 and 7 depict operation of the connection under a substantially vertical overload, acting in the zone labeled "lower fuse pin critical." The lower shear pin 42 breaks and the beam 24 and the connector plate means 34 swing upwardly. If when these parts reach their limit of travel the force on shear pin 40 exceeds its capacity, pin 40 will break, as shown by FIG. 7.

Figure 8:
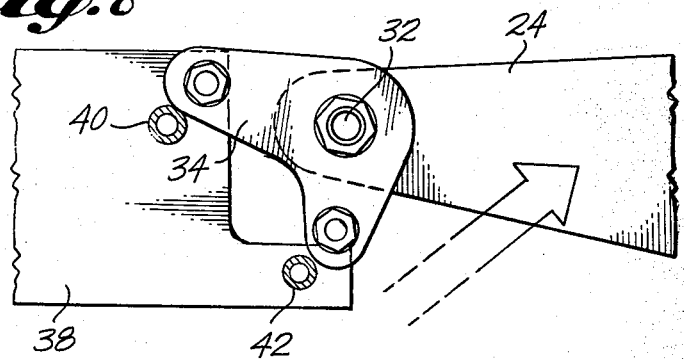
FIG. 8 is a view like FIGS. 5, 6 and 7, but showing a generally horizontal force on the joint which is from the beginning carried by both shear pins and which must break both shear pins in order to cause the joint to fail.

FIG. 8 depicts what happens when the overload is directed along a line coincident with the maximum reaction capacity of the reaction structure. In FIG. 3 this point on the polar is labeled "upper and lower fuse pins equally critical at this point." As shown by FIG. 8, what happens is that both pins are sheared by the overload.

In the illustrated embodiment the shear pins or fuse bolts 40, 42 are put into double shear. Accordingly, the connector plate means comprises two plates, one located on each side of the connection. In another installation it may be appropriate to put the shear pins in a single shear in which case the connector plate means may comprise a single plate located on one side of the connection. The illustrated embodiment is shown to be used at one end of a beam which has a pivot joint at each of its ends. In another installation it might be advantageous to employ the connection at one end of a beam which is relatively fixed at its opposite end, in which case the moment capability of the beam would have to be considered when computing the necessary capacity of the shear pins.

As best shown by FIGS. 1 and 2, the cantilever beam 38 comprises a longitudinally extending web W and upper and lower flanges UF, LF, providing it with strength and stiffness. The brace member 52 may be of a similar construction.

As best shown by FIGS. 1 and 2, control system means, e.g. electrical control wires, for operating portions of the aircraft outwardly from the wheel assembly 10 are located along the rear side of the wing spar WS. Openings are cut through the web portions of the brace member 52 and the cantilever 38, closely to where such members are attached to the wing spar WS. The control system means extend through these openings (FIG. 2).

As best shown by FIGS. 1 and 2, if the landing gear 10 were to encounter some overload causing it to break fused connection 40, 42, the breakage away of landing gear structure would in most instances cause no damage to the control system means CL. FIG. 22, showing a typical embodiment of the invention in an actual aircraft, shows that some wing trailing edge cover and some control surfaces exist rearwardly of the simple beam 24, in a position to be damaged or torn off by the landing gear structure as it is broken loose from the aircraft frame members. However, in most instances, a sufficient amount of the wing structure and its control surfaces will be left to enable the pilot to fly up from the runway, following the loss of a landing gear, to enable ground personnel to apply fire retarding foam on the landing field before he attempts to make a landing minus one or both of the landing gear.

FIGS. 9-20 illustrate the problems that would be encountered if one attempted to mount a landing gear further away from the airplane body and further aft than is conventional, by use of either one of the known or conventional ways of supporting the rear end of the landing gear trunion.

Figure 9:
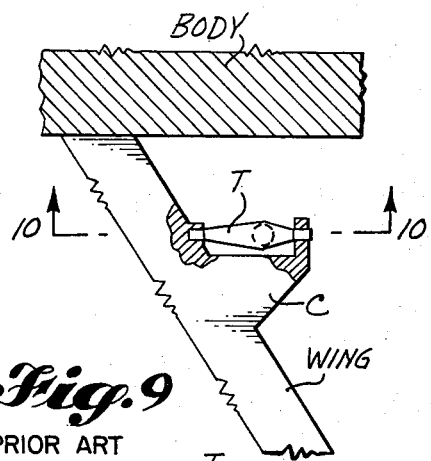
FIG. 9 is a diagramatical top plan view of a conventional landing gear support structure in which the rear bearing for the landing gear trunnion is supported by a cantilever beam which projects rearwardly from the rear wing spar.
Figure 10:
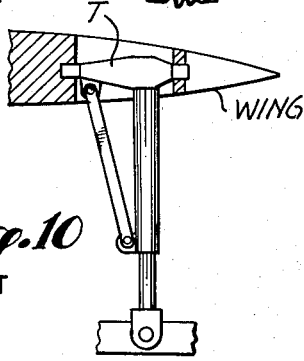
FIG. 10 is a sectional view through the wing, taken along line 10—10 of FIG. 9, and including a diagramatical elevational view looking towards the outer side of the main landing gear spar.
Figure 11:
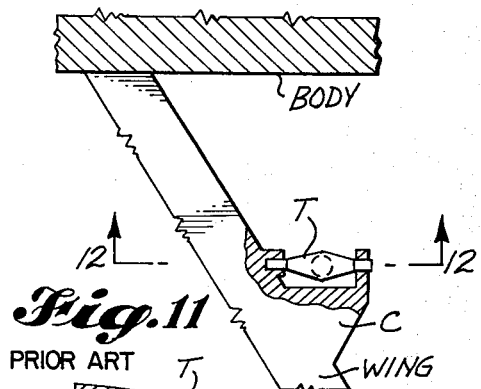
FIG. 11 is a view like FIG. 9, but showing the smaller size of the landing gear trunnion that would be dictated by the wing space available at the new location if the landing gear were to be moved further outwardly and further aft.

FIG. 9 is a diagramatic top plan view of the conventional way of using a cantilever structure alone for supporting the rear bearing of a trunnion T. FIG. 10 is a view partially in section and partiallly in elevation, showing how the wing contour affects the design of the trunnion and its support. FIGS. 10 and 11 show that with the same wing structure, it would be necessary to reduce the trunnion both in length and diameter, and the cantilever structure would have to be smaller, if the landing gear location where to moved outwardly and rearwardly.

Figure 13:
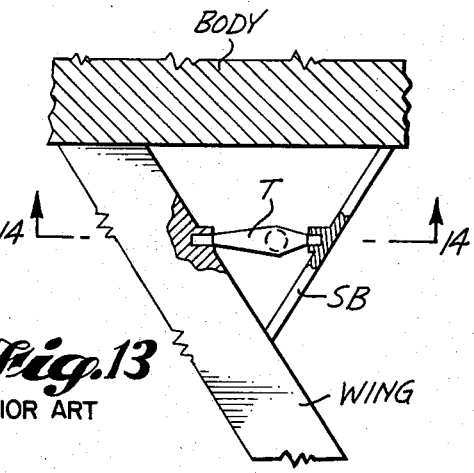
FIG. 13 is a diagramatical top plan view of a conventional landing gear support structure of a type including a simple beam for supporting the aft end of the trunnion.
Figure 14:
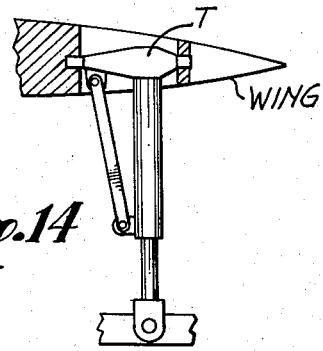
FIG. 14 is a view like FIGS. 10 and 12, but taken along line 14—14 of FIG. 13.

FIGS. 13 and 14 show the customary position of a landing gear in an aircraft in which a simple beam SB is used for supporting the aft end of the trunnion T.

Figure 15:
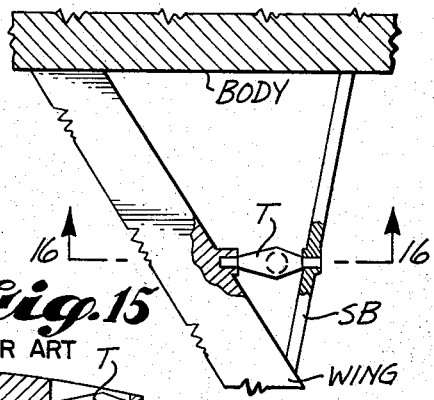
FIG. 15 is a view like FIG. 13, but showing the landing gear shifted to a farther out and farther aft position, and showing a decrease in the length of the trunnion dictated by the wing space at such new location.
Figure 12:
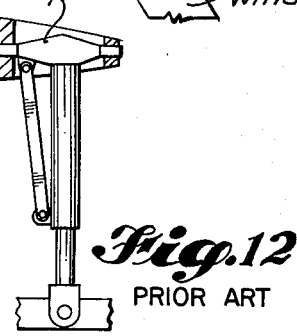
FIG. 12 is a view like FIG. 10, but taken along line 12—12 of FIG. 11.
Figure 16:
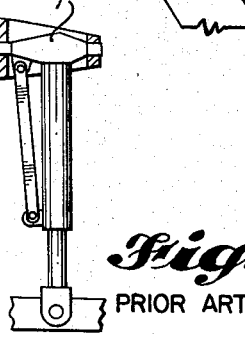
FIG. 16 is a view like FIGS. 10, 12 and 14, but taken along line 16—16 of FIG. 15.
Figure 17:
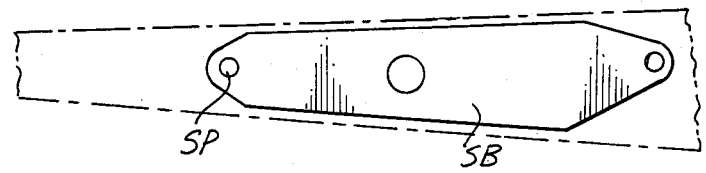
FIG. 17-20 are diagramatic views looking towards the rear face of a conventional landing gear simple beam, showing how the wing space dictates an increased length and decreased depth of the beam as the outboard end of the beam is moved farther outwardly and farther aft.
Figure 18:
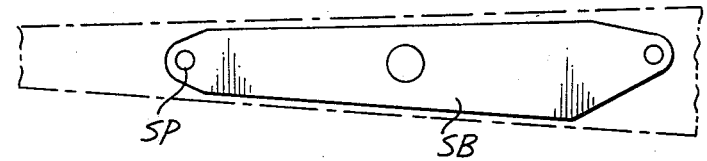
Figure 19:
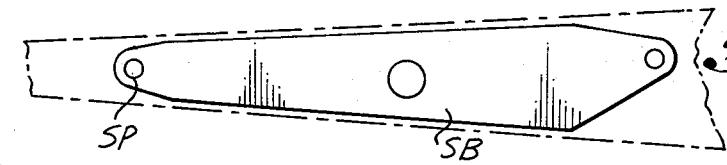
Figure 20:
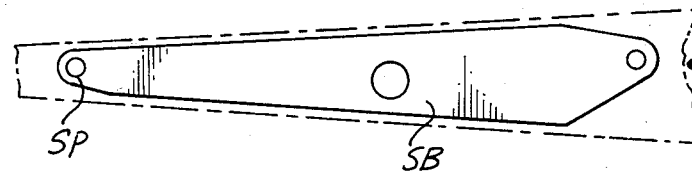

FIGS. 15 and 16 show that any attempted relocation of the landing gear farther out and farther aft would make it necessary to reduce the size of the trunnion, and would result in a longer and shallower simple beam SB. FIGS. 17-20 show the change in size and shape of the simple beam SB that is necessary as the outer end securement point SP is progressively moved outwardly.

Figure 21:
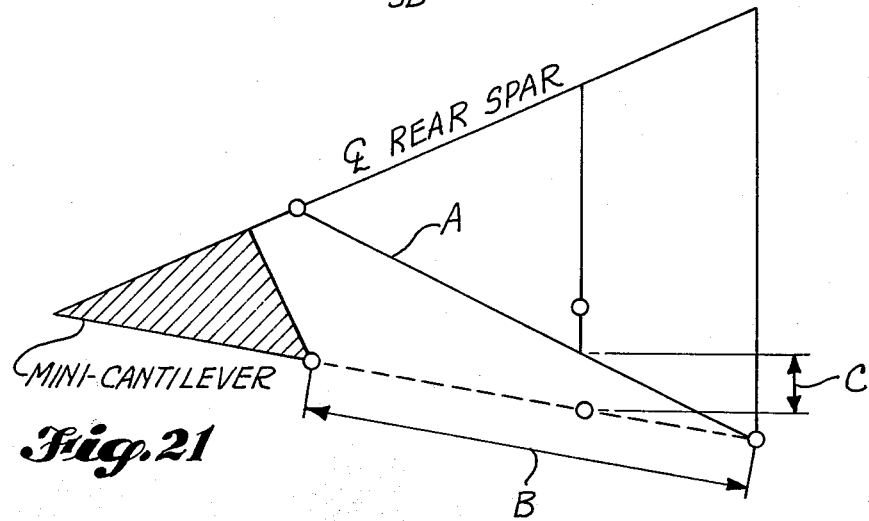
FIG. 21 is a plan view diagram comparing in one view a conventional cantilever, a conventional simple beam, and the combined cantilever and simple beam design of the present invention.

FIG. 21 graphically illustrates the advantage of the combined beam structure of the present invention. The dimension C indicates the center gravity shift of the landing gear in the aft direction which is gained by use of the mini-cantilever beam in combination with the simple beam. A comparison of dimensions A and B show that this position gain of the landing gear is obtained together with a stiffness gain in the simple beam.

There is also a gain in length space for the trunnion. In other words, the simple beam occupying the space B is shorter than a conventional single beam occupying the position A. The beam in position B has a smaller depth than the beam in position A. However, this is permissable because the beam in position B is shorter than the beam in position A.

From the foregoing, further variations, adaptations and modifications in the environment structure and the details of construction of the beam details may be evolved by those skilled in the art to which the invention is addressed. Accordingly, the scope of protection of the invention is not to be determined by the details of the illustrated embodiment but rather by the terms of the appended claims.

What is claimed is:

1. In an aircraft, an improved landing gear mount comprising:

an aircraft body frame;

a wing spar extending laterally outwardly from said body frame;

a cantilever beam projecting rearwardly from the wing spar and extending inwardly towards the body frame;

a landing gear support beam positioned rearwardly of the wing spar and extending between the cantilever beam and the body frame;

means connecting the inboard end of said landing gear support beam to the body frame including a first pin connection;

a second pin connection between the outboard end of the landing gear support beam and the cantilever beam, said second pin connection being spaced both rearwardly and towards the body frame from said wing spar;

a landing gear including a main strut, wheel means at the lower end of the main strut, and a trunnion at the upper end of the main strut;

a forward bearing for the trunnion mounted on the wing spar; and an aft bearing for the trunnion mounted on the landing gear support beam.

2. An improved landing gear mount according to claim 1, wherein the cantilever beam includes a fixed end secured to the wing spar and a free end to which the landing support beam is connected, and further including a brace means interconnected between the wing spar and an intermediate portion of the cantilever beam.

3. An improved landing gear mount according to claim 1, wherein the cantilever beam comprises a relatively thin web wall and stiffening flanges extending generally normal to said wall, providing a relatively light weight but strong and stiff structure.

4. An improved landing gear mount according to claim 3, further comprising a brace means extending rearwardly from the wing spar to a connection with an intermediate portion of the cantilever beam.

5. An improved landing gear mount according to claim 4, comprising at least one avenue for control line means provided in the cantilever beam adjacent the wing spar and forwardly of the connection between the outboard end of the landing gear support beam and the cantilever beam.

6. An improved landing gear mount according to claim 5, wherein the landing gear includes a control lever projecting from the trunnion generally on the opposite side of the trunnion from the main strut, and a linear actuator for moving the landing gear between its extended and retracted positions interconnected between said lever and the brace means of the cantilever beam.

7. An improved landing gear mount according to claim 6, wherein the avenue for the control line means extends through the brace means for the cantilever beam.

8. In an aircraft, an improved landing gear mount comprising:
   an aircraft body frame;
   a wing spar extending laterally outwardly from said body frame;
   a cantilever beam projecting rearwardly from the wing spar and extending inwardly towards the body frame;
   a landing gear support beam positioned rearwardly of the wing spar extending between the cantilever beam and the body frame;
   means connecting the inboard end of said landing gear support beam to the body frame;
   a connection between the outboard end of the landing gear support beam and the cantilever beam;
   a landing gear including a main strut, wheel means at the lower end of the main strut, and a trunnion at the upper end of the main strut;
   a forward bearing for the trunnion mounted on the wing spar;
   an aft bearing for the trunnion mounted on the landing gear support beam; and
   wherein the connection between the outboard end of the landing gear support beam and the cantilever beam includes fused connector means adapted to break when subjected to an overload larger than the load reacting capacity of the cantilever beam and/or the wing spar.

9. An improved landing gear mount according to claim 8, comprising a pin connection at each end of the landing gear support beam.

10. An improved landing gear mount according to claim 8, wherein the landing gear includes a control lever projecting from the trunnion generally on the opposite side of the trunnion from the main strut, and a linear actuator for moving the landing gear between its extended and retracted positions interconnected between said lever and the cantilever beam.

11. An improved landing gear mount according to claim 10, comprising a pin connection at each end of the landing gear support beam.

12. In an aircraft, an improved landing gear mount comprising:
   an aircraft body frame;
   a wing spar extending laterally outwardly from said body frame;
   a cantilever beam projecting rearwardly from the wing spar and extending inwardly towards the body frame;
   a landing gear support beam positioned rearwardly of the wing spar extending between the cantilever beam and the body frame;
   means connecting the inboard end of said landing gear support beam to the body frame;
   a connection between the outboard end of the landing gear support beam and the cantilever beam;
   a landing gear including a main strut, wheel means at the lower end of the main strut, and a trunnion at the upper end of the main strut;
   a forward bearing for the trunnion mounted on the wing spar;
   an aft bearing for the trunnion mounted on the landing gear support beam; and
   at least one avenue for control line means provided in the cantilever beam adjacent the wing spar and forwardly of the connection between the outboard end of the landing gear support beam and the cantilever beam.

13. An improved landing gear mount according to claim 12, wherein the connection between the outboard end of the landing gear support beam and the cantilever beam includes fused connector means adapted to break when subjected to an overload larger than the load reacting capacity of the cantilever beam and/or the wing spar.

14. An improved landing gear mount according to claim 13, comprising a pin connection at each end of the landing gear support beam.

* * * * *